US 7,352,912 B2

(12) United States Patent
Eschbach

(10) Patent No.: US 7,352,912 B2
(45) Date of Patent: Apr. 1, 2008

(54) METHOD FOR AUTOMATICALLY DETERMINING A REGION OF INTEREST FOR TEXT AND DATA OVERLAY

(75) Inventor: Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 601 days.

(21) Appl. No.: 11/009,562

(22) Filed: Dec. 10, 2004

(65) Prior Publication Data
US 2006/0126932 A1   Jun. 15, 2006

(51) Int. Cl.
*G06K 9/40*   (2006.01)
*G06K 9/20*   (2006.01)
*G06K 9/34*   (2006.01)
*G06K 9/36*   (2006.01)

(52) U.S. Cl. .................. 382/264; 382/282; 382/176

(58) Field of Classification Search ........... 382/173, 382/176, 180, 286, 284, 282, 283, 294, 291, 382/264, 254; 345/629, 630, 632–640; 358/540, 358/450, 452, 464
See application file for complete search history.

(56) References Cited

U.S. PATENT DOCUMENTS

| 4,651,278 A * | 3/1987 | Herzog et al. ............ 358/1.18 |
| 5,347,374 A | 9/1994 | Fuss et al. |
| 5,357,352 A | 10/1994 | Eschbach |
| 5,363,209 A | 11/1994 | Eschbach et al. |
| 5,371,615 A | 12/1994 | Eschbach |
| 5,414,538 A | 5/1995 | Eschbach |
| 5,450,217 A | 9/1995 | Eschbach et al. |
| 5,450,502 A | 9/1995 | Eschbach et al. |
| 5,465,304 A | 11/1995 | Cullen et al. |
| 5,802,214 A | 9/1998 | Eschbach et al. |
| 6,282,317 B1 | 8/2001 | Luo et al. |
| 6,470,095 B2 | 10/2002 | Mahoney et al. |
| 6,665,342 B1 * | 12/2003 | Brown et al. .......... 375/240.16 |
| 6,711,291 B1 * | 3/2004 | Stubler et al. ............. 382/195 |
| 2001/0043741 A1 | 11/2001 | Mahoney et al. |
| 2002/0054116 A1 | 5/2002 | Pavley et al. |
| 2002/0101513 A1 | 8/2002 | Halverson |
| 2002/0131625 A1 * | 9/2002 | Vining et al. ............... 382/128 |

OTHER PUBLICATIONS

R. C. Gonzales and B. A. Fittes, "Gray level transformation for interactive image enhancement," Proc. Second Conference on Remotely Manned Systems 1975.
E. L. Hall, "Almost uniform distributions for computer image enhancement," IEEE Trans. Comput. C-23,207-208, 1974.

(Continued)

*Primary Examiner*—Yon J. Couso
(74) *Attorney, Agent, or Firm*—Duane C. Basch; Basch & Nickerson LLP

(57) ABSTRACT

Provided is a method for the automatic determination of a region of interest in an image, comprising the steps of: segmenting the image into a plurality of smaller regions, each region extending over a plurality of pixels; performing an analysis on each of said regions to characterize an aspect of the region relating to its level of importance in communicating information to a viewer; grouping adjacent regions having similar aspect characteristics; and identifying at least one group as a region of interest. Also provided is a method employing the steps above for use in an automated document composition process, where overlaid content is not placed over regions of interest that are identified.

18 Claims, 13 Drawing Sheets

OTHER PUBLICATIONS

S. M. Pizer et al., "Adaptive histogram equalization and its variations," Comput. Vision graphics and Image Proc. 39, 355-368, 1987.
A, Usami; "Signal Processing by the Input Interface to a Digital Color Laser Copier"; SID 90 Digest, 1990 pp. 498-500.

A. Inoue et al.; Adaptive Quality Inprovement Method for Color Images; ISAT Symposium on Electronic Imaging Science and Technology; 2179-43, 1994.

* cited by examiner

| 71 | 161 | 159 | 44 | 148 | 462 | 482 | 337 | 453 | 376 |
|---|---|---|---|---|---|---|---|---|---|
| 61 | 165 | 261 | 408 | 639 | 745 | 816 | 841 | 1004 | 1071 |
| 184 | 579 | 584 | 296 | 238 | 629 | 1021 | 866 | 1066 | 968 |
| 111 | 536 | 958 | 157 | 115 | 872 | 1030 | 713 | 587 | 749 |
| 63 | 25 | 259 | 17 | 44 | 155 | 113 | 418 | 716 | 690 |
| 15 | 20 | 23 | 16 | 41 | 10 | 13 | 28 | 81 | 174 |
| 44 | 125 | 104 | 58 | 103 | 26 | 13 | 37 | 79 | 57 |
| 66 | 277 | 214 | 83 | 38 | 43 | 45 | 62 | 11 | 68 |
| 47 | 99 | 103 | 47 | 72 | 95 | 120 | 50 | 30 | 50 |
| 42 | 95 | 61 | 63 | 48 | 78 | 67 | 70 | 76 | 57 |

FIG. 4

METHOD FOR AUTOMATICALLY DETERMINING A REGION OF INTEREST FOR TEXT AND DATA OVERLAY

CROSS-REFERENCE TO RELATED APPLICATIONS

Cross-reference is made to the following commonly assigned U.S. Patents to Eschbach et al., each of which is hereby expressly incorporated by reference herein: U.S. Pat. No. 5,414,538; U.S. Pat. No. 5,357,352; U.S. Pat. No. 5,450,502; U.S. Pat. No. 5,371,615; U.S. Pat. No. 5,363,209; U.S. Pat. No. 5,450,217; and, U.S. Pat. No. 5,802,214. Similarly, commonly assigned U.S. Pat. No. 5,347,374 to Fuss et al. is also hereby expressly incorporated by reference herein.

A method is provided to facilitate automated document composition, and more particularly a method to identify regions of interest in a document or image so as to prevent overlaying of images or text thereon during document composition.

BACKGROUND AND SUMMARY

In a large number of documents, images are used as a backdrop to the actual document content in order to convey a message, mood or feeling. In these cases, other objects quite often are superimposed or overlaid over the image. For example in a life insurance brochure, the image of a "family" might serve as the backdrop to the actual life insurance advertisement. In order to overlay other objects or text over an image, the proper image regions have to be identified. More specifically, regions of the image that are of lower interest would be more likely regions to be overlaid. To date, such composition techniques have been manually accomplished by graphics designers and the like, making the creation of such layouts expensive. The method provided herein is directed to automatic detection of a Region of Interest (ROI), particularly a method that can aid in automatic creation of text or object overlay of images.

In order to overlay text or other objects onto an image, one has to avoid image areas that are of importance to an observer. For instance, it is highly undesirable to overlay the text over important image detail, such as the eyes of a person, the goods that are the subject of the advertisement, etc. The described method represents one way of automatically identifying regions for image overlay, by defining regions of interest, and thus, conversely, regions of little interest in an image—based on contrast metrics such as those developed in the context of automatic image enhancement (AIE).

In order to automatically overlay text over images for variable data applications, relatively large image areas have to be identified that have a low likelihood of being disturbed by the overlaid text, and vice versa. This also means that some small area of detail might be obstructed if it is in an otherwise "low-relevance" area. Simultaneously, good locations for text overlay will be ignored if they are too small. For this purpose, image areas of low relevance have to be found. There are clearly several criteria that influence the relevance of image areas and the following disclosure illustrates an example of one such criterion, namely the black and white contrast.

The following patents or publications are noted:

US 2001/0043741 by Mahoney et al, of Xerox Corporation, published Nov. 22, 2001, teaches the use of spatial separations between clusters of objects on an electronic work surface to automatically generate borders.

U.S. Pat. No. 6,711,291 to P. Stubler et al., issued Mar. 3, 2003, teaches a method for placing a human understandable item, such as a caption, text or a figurative element, in a digital image.

Empirical evidence suggests that regions of images that are important are relatively high in contrast. In other words, the image region makes use of essentially the entire dynamic range that is possible. The dynamic range of an image can be characterized by a histogram on the image, and preferred images tended to be characterized by histograms indicating that the entire dynamic range of the image is used. Hence, algorithms exist that modify an image in a way as to generate a histogram that covers the entire dynamic range. The most common algorithm is the histogram flattening/histogram equalization algorithm as described in R. C. Gonzales and B. A. Fittes, "Gray level transformation for interactive image enhancement," Proc. Second Conference on Remotely Manned Systems 1975, E. L. Hall, "Almost uniform distributions for computer image enhancement," IEEE Trans. Comput. C-23,207-208, 1974, W. K. Pratt, Digital Image Processing, Wiley, New York, 1978, and M. P. Ekstrom, Digital Image Processing Techniques, Academic Press, Orlando, 1984, J. C. Russ, The Image Processing Handbook, CRC Press, Boca Raton, 1992. Modifications to the histogram equalization techniques are known as adaptive histogram equalization (AHE) as in S. M. Pizer et al., "Adaptive histogram equalization and its variations," Comput. Vision graphics and Image Proc. 39, 355-368, 1987 and the citations thereof. AHE again tends to work well when the aesthetic appearance of the image is not critical, but the information content of the image (that is, i.e. how well details are visible) is critical. When these goals and assumptions are not in place, histogram flattening and its known modifications work poorly.

In view of the need to automatically incorporate variable data into documents, as presented by today's printing technology, and the known relationship between image contrast and an observer's interest in an image, the method provided herein is believed to be advantageous. Disclosed in embodiments herein is a method for the automatic determination of a region of interest in an image, comprising the steps of: segmenting the image into a plurality of smaller regions, each region extending over a plurality of pixels; performing an analysis on each of said regions to characterize an aspect of the region relating to its level of importance in communicating information to a viewer; grouping adjacent regions having similar aspect characteristics; and identifying at least one group as a region of interest.

Also disclosed in embodiments herein is an automated document composition process, comprising the steps of: receiving a document including at least one image therein; specifying content to be overlaid on at least a portion of the image; identifying at least one low interest region of the image upon which the content may be overlaid; and automatically inserting at least a portion of the content into at least the one region.

BRIEF DESCRIPTION OF THE DRAWINGS

FIGS. 4 through 11 are information maps depicting the sequential and alternative processing steps of the method of FIGS. 1 and 2 as applied to the image of FIG. 3.

Figure 1:
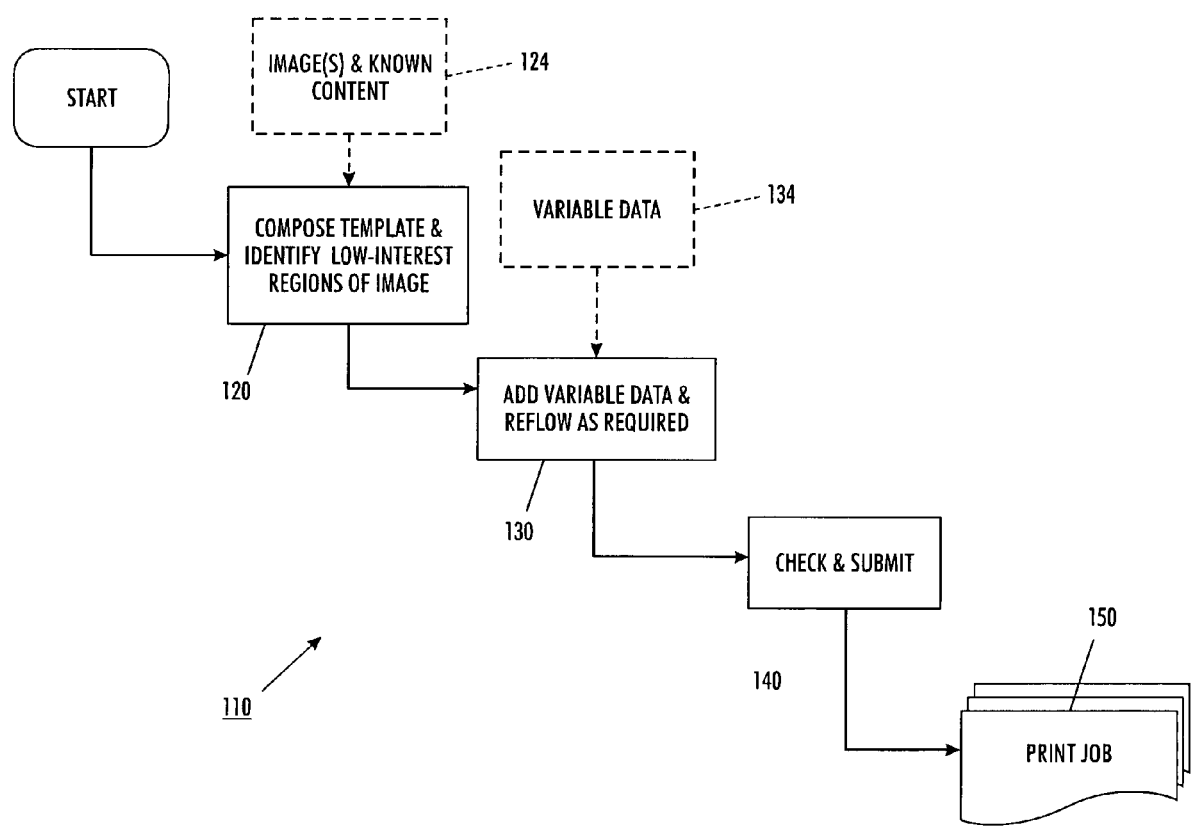
FIGS. 1 and 2 are illustrative flowcharts depicting general steps in the methods described herein.

The following disclosure will be characterized in connection with a preferred embodiment, however, it will be understood that there is no intent to limit the disclosure or scope to the embodiment described. On the contrary, the intent is to cover all alternatives, modifications, and equivalents as may be included within the spirit and scope of the appended claims.

DETAILED DESCRIPTION

For a general understanding of the method and described embodiments, reference is made to the drawings. In the drawings, like reference numerals have been used throughout to designate identical elements. As will be further appreciated the method described herein may be carried out on a composition or printing system, and more particularly, on one or more processors associated with a commercial printing system.

Referring now to FIG. 1, there is depicted a general method 110 for an automated document composition process. Process 110, starts at step 120 by receiving a document or document content, including at least one image. In an automated process, this document may be in the form of a template or other layout-control information, where the general format and content are defined or perhaps edited at step 120. Subsequently, at step 130, the data or content to be added, e.g., variable data 134, is received and added for insertion and overlay on the image(s) and known content 124. In order to correctly insert the variable data, step 140 checks the overlay region to assure that, at least with respect to the image, it is overlaid only in a region(s) of low interest (i.e., a region of low importance to an observer). As a result of the check and submit operation at step 140, at least a portion of the content is automatically inserted into a region of the image.

Figure 2:
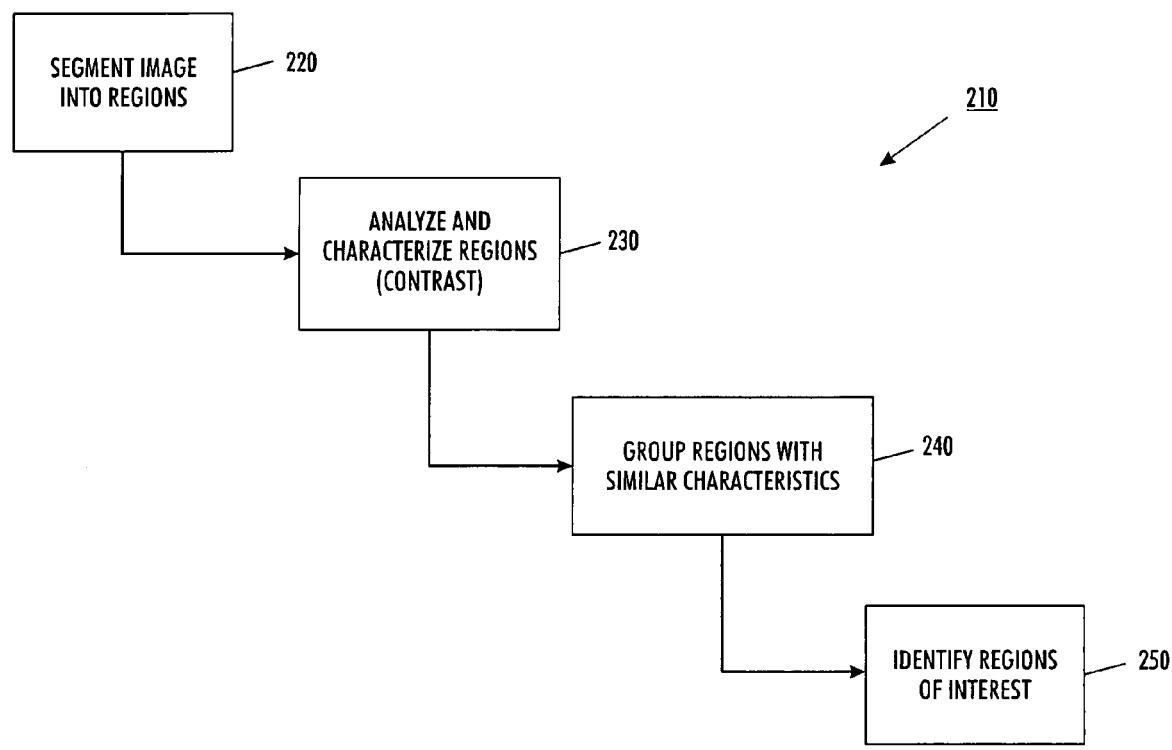

Having described the general method of automatically composing a document, attention is now turned to FIGS. 2-13, which include a flowchart and illustrative image examples as will now be described in more detail. Referring to FIG. 2, there is illustrated a general method 210 for the automatic determination of a region of interest in an image. As represented by step 220, the process begins by segmenting the image into a plurality of smaller regions (see FIG. 3), each region extending over a plurality of pixels. Although depicted in FIG. 3 as regular rectangles, it will be further appreciated that alternative shapes or segmentation techniques, including overlapping shapes, may be employed to divide the image into regions. Furthermore, the image is segmented into a predefined number of regions, or into regions having at least one predefined dimension (e.g., height, width, or height×width).

Once an image is segmented into regions, step 230 performs an analysis on each region to characterize an aspect of the region in relation to its level of importance in communicating information to a viewer. In other words, the analysis seeks to characterize the level of interest, or importance to an observer based upon a measurable aspect of the image. As will be further described in detail below, one method of characterizing the level of interest to an observer would be accomplished by determining a contrast value for each region. It will again be appreciated that other measures of the level of interest may include aspects such as colorfulness, and/or brightness, etc., which will be understood to be suitable augmenting measures in accordance with the embodiment described. It should also be appreciated that any system determining the low importance of an image region inherently identifies the dominant characteristics of such regions—and that this identification can be directly used in determining the characteristics of the overlay information. For example, an image area might be found to be of low importance due to a low overall contrast and simultaneously of "dark" characteristic (i.e., low brightness). In this case, the overlay information, such as text, would preferably be of light color of high brightness. Correspondingly, finding a high color saturation in one color could be used to choose the overlay color to be a contrasting but still harmonious color.

Once the regions have been characterized, the method continues at step 240 where regions of similar interest or importance are grouped. In particular, direct comparison, filtering and other operations may be applied to the characteristics for such regions in order to identify regions that may be incorporated into a group so as to define a larger region that would not significantly impact the image were the larger region, to be overlaid with text or other content. Thus, based upon the grouping of step 240, the process would continue at step 250 to identify the larger region as a region of interest. For situations where segmentation into overlapping regions was employed, a logic filtering can also be applied, e.g.: requiring that any or all overlapping parts have an identification of low importance attached to them.

Figure 3:
FIGS. 3, 12 and 13 are illustrative examples of an image file processed in accordance with the method and associated procedures.

Referring also to FIGS. 3-11, a detailed example of the afore-described process steps 230-250 will be set forth. In the first part of the process, in a manner similar to that described in U.S. Pat. No. 5,450,502 to Eschbach, previously incorporated by reference, luminance based contrast determination is carried out to identify regions or interest (or regions of non-interest). In particular, the image is first "segmented" into a plurality of image areas or segments (for example 10 rows×10 columns) as illustrated in FIG. 3. As with traditional Region of Interest approaches, the intention is to identify "areas" of at least a minimum size and does not try to find pixels or small pixel groups.

The next step, accomplished in accordance with an automated image enhancement device such as that disclosed in U.S. Pat. No. 5,450,502 to Eschbach, previously incorporated herein, is to measure the image in terms of some system parameter. In the present embodiment, a global histogram of the luminance or Y-component of the pictorial image will be optionally derived. The global histogram refers to the entire image. If operating in a multi-bit space, such as 8-bit space, we will find that the luminance values will be distributed between 0 and 255.

This global metric may be used to identify the relative importance of image areas when comparing the measure to the local measures. It is also envisioned that this global metric might be altogether omitted, or used as an overall indicator identifying which images should be considered or not at all considered for overlay.

Next, in addition to the global histogram of the entire image, the image is divided into a set of local areas or regions 320 as depicted in FIG. 3 (from (0,0) to (m,n)), not necessarily identical in size, or ordered in any fashion, and histograms from each local area are also derived. Local area histograms are derived because in a large number of images, locality gives some indication of the relative importance of image parts.

The next step in the analysis process based upon image contrast compares the global histogram to a reference, which in the example is a flat histogram. A flat histogram, as defined herein, is a reference signal, which provides a uniform number of pixel counts for each density or luminance possible within the image. The global histogram is compared to this flat histogram to give a global measure of contrast in the form of a variance. The Contrast Variance (Vc) is represented by the equation:

$$V_C = c \times \sum_{i,j}^{m,n} [H(i, j) - R(i, j)]^2 \quad (1)$$

where "c" is a renormalization constant, and where H(i,j) represents the histogram function of the region in consideration; R(i,j) represents the flat histogram or the reference histogram; and i,j represents the particular two-dimensional position in the image. Independent on the actual shape of the reference histogram, we will consider the above described operation to measure the flatness if the histogram H.

Generally speaking, with reference to the variance, the smaller the value, the flatter the histogram. The variance value is determined for each of the local histograms and is shown in FIG. 4. As can be seen by comparison, the variances of the local histograms vary widely, ranging in number from 10 (local histogram 412) to 1071 (local histogram 422) as illustrated in FIG. 4.

The contrast map 400 is now used as the basis to find relatively large, connected regions. The definition of "large" for the purpose of this description will become clearer in the following sections. As can be seen from FIG. 3, the fixed area definition leads to rectangular areas rather than quadratic ones. This is in line with the procedure outlined in U.S. Pat. No. 5,450,502, but it can easily be changed from a constant number of areas, to areas of constant size (in one or more dimensions as described above. This contrast map 400 of FIG. 4 is first averaged to eliminate small local areas, producing a result such as the averaged map 500 depicted in FIG. 5. The averaging process may be accomplished using a linear low-pass filtering process, or a non-linear logical filtering, such as order statistics, or some other averaging filter. As should be noted with respect to FIG. 5, an off-centered averaging was used for simplicity, avoiding the handling of the image edges. This was chosen purely for simplicity of description. A centered averaging is preferred in the embodiment, with edges being handled according to standard methods. This averaged map is further filtered by using the maximum over a 3×3 area. Resulting in map 600 as illustrated in FIG. 6, which depicts an order statistic filtering of the low-pass contrast map 500 to maintain area maxima.

Of the 10×10 contrast map 600, only an 8×8 area contains valid data based on the two off-center operations described. The image edges can be handled in a simple manner since they commonly do not contain important image content. However, the edges can simply be included by changing the filter support region if desired. It should be noted that the difference between centered and off-centered averaging changes the definition of edge areas, but does not essentially influence the handling of said areas.

Figure 6:
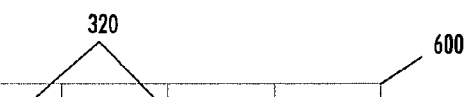

The contrast map of FIG. 6 can now be used to define a preliminary area of "low interest" for the image of FIG. 3. The preliminary area of low interest can be created or defined by weighting contrast attributes, or in other words giving high values to areas of low contrast. For example, areas that are clearly lower contrast than the overall contrast should receive a small or no value, but also the areas of overall lowest contrast should receive a higher value, etc.

Figure 5:
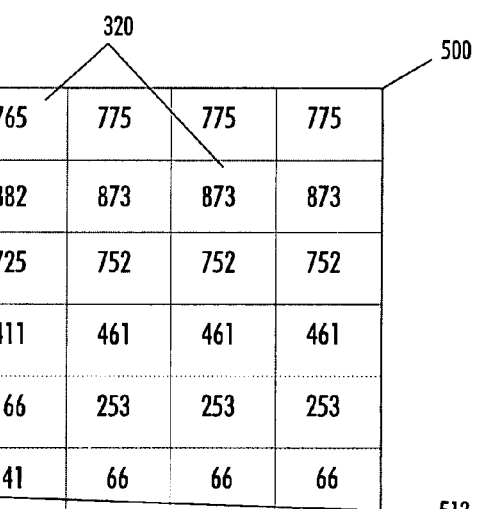

Alternatively, an exclusion rule can be used, assigning negative values to high contrast areas, e.g.: area 512 in FIG. 5, thereby alleviating the low-pass filtering effect for such areas. Based on this, we can develop a multiple-weight scheme that assesses different values to the individual areas as a function of the relative and absolute contrast. For a simple example, every area that has a contrast of a factor of ten "worse" than the best image contrast (in this case region 512 from FIG. 5) gets a score of "10", and a score of "20" if the contrast is worse by a factor of twenty. Additionally, each region having a contrast of a factor of three worse than the average contrast (in this case "277") gets an additional score of "10", and an additional score of "20" if it is 4 times worse. Also, the actual lowest contrast gets an additional score of "7". In this way, we create a preliminary area of low contrast that can be used to further refine the area. It should be noted that at this stage the actual score is not important, rather the ability to identify the different areas has to be maintained, i.e.: singly or doubly classified as "low relevance", and actual "worst" contrast. An example for a different scoring scheme is demonstrated below using FIGS. 8 and 9. This multiple classification can serve in subsequent classification steps, when, e.g.: the area size or shape has to be adjusted. In situations where a global contrast measure was derived, additional scoring can be derived for the overall image, such as rejecting the image due to the high contrast nature of the image, or by altering the thresholds in the area selection, e.g. for an image of very low global contrast.

Figure 7:
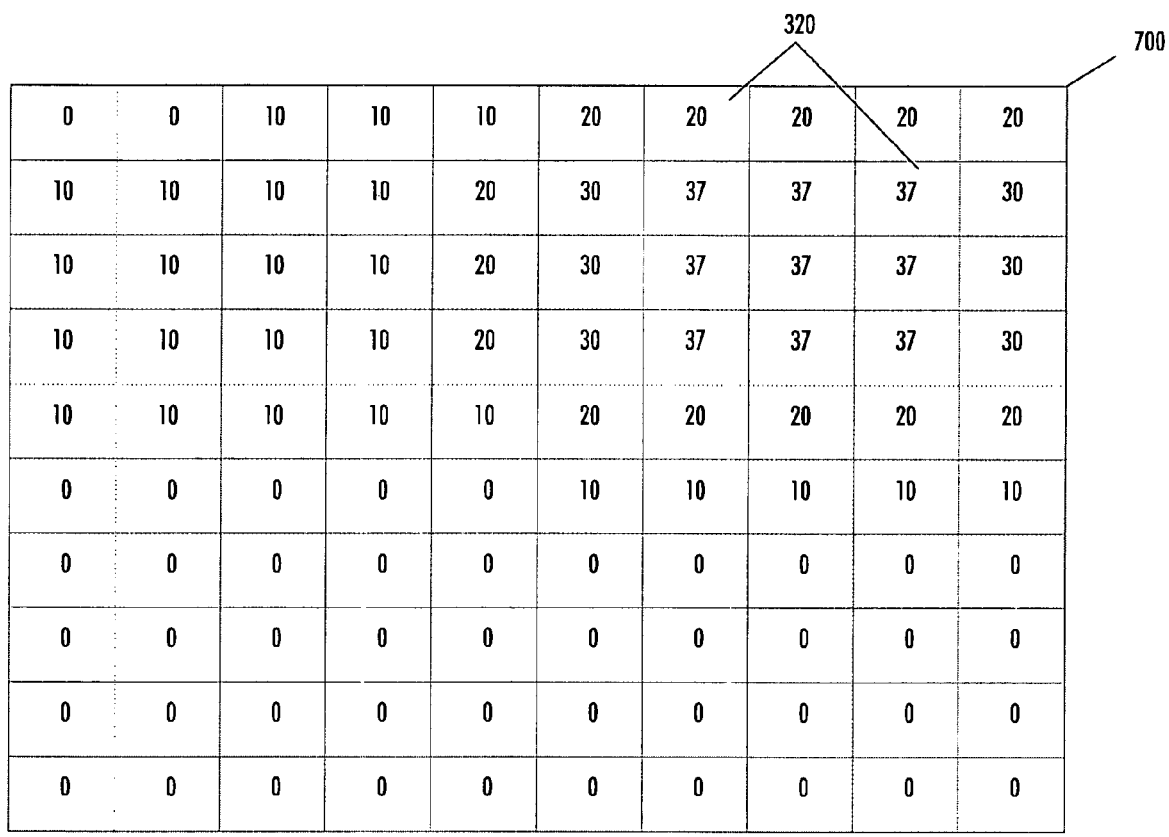

The result of the scoring process above is reflected in map 700 of FIG. 7, where the contrast map of FIG. 6 has been translated to a selection map. Maintaining the automated image enhancement philosophy of multiple classifications, the same process to create FIG. 7 can be performed assuming a 4×4 averaging and maximum determination (giving a "best" contrast of "46" and an average of "264"). This leads to alternative contrast map 800 (FIG. 8), which was filtered with different low-pass parameters.

Figure 8:
Figure 9:
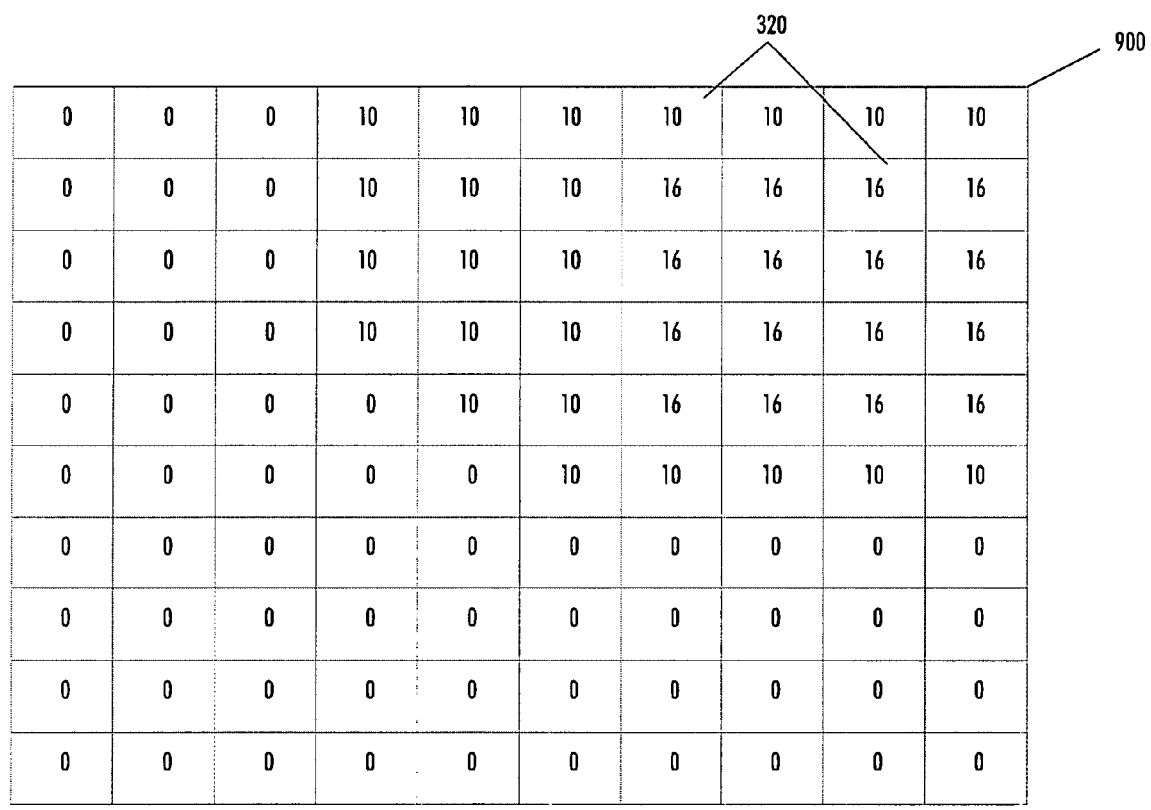

Next, translating the contrast map of FIG. 8 to a selection map, we see the corresponding classification of map 900 (for "book keeping" purposes only a "6" was added for the maximum). Note that no area had a contrast worse than 3-times the average contrast, i.e.: larger than 792 and thus only a "weak" selection was formed from the 4×4 data of FIG. 8. FIG. 9 is thus the equivalent of FIG. 7, using a slightly different scoring scheme.

Figure 10:
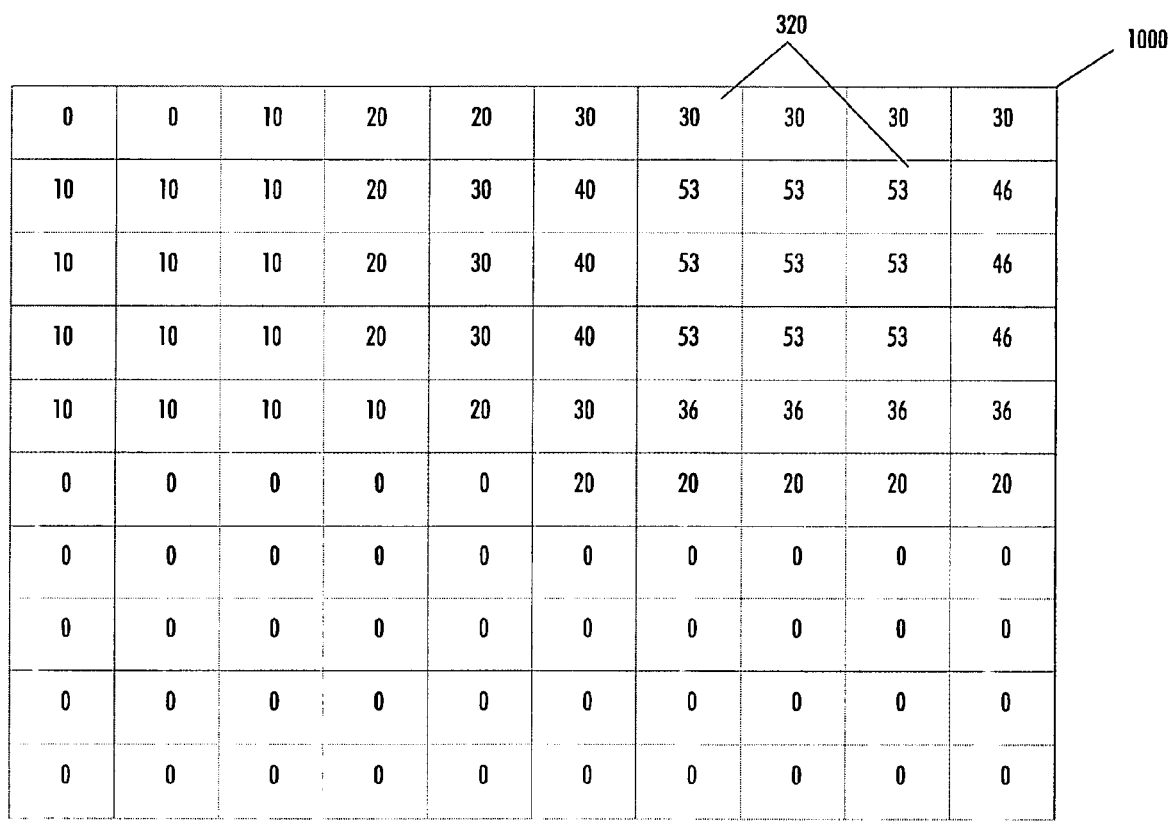

Different scoring schemes can be combined, if desired. For example, upon combining the maps 700 and 900, respectively FIGS. 7 and 9, one obtains an "aggregated" importance map 1000 as depicted in FIG. 10. Contrast map 1000 enables the selection of large areas for text overlay by a thresholding operation. This thresholding can be done in a variety of ways, including: (a) all areas above a certain value can be selected; (b) the N highest areas can be selected, (c) a hybrid thresholding based on (a) and (b); and/or (d) a conditional thresholding through Boolean combination of the different averages (3×, 4×) etc. For the present example a hybrid thresholding operation was employed because it can also illustrate one other attribute of the method.

Figure 11:
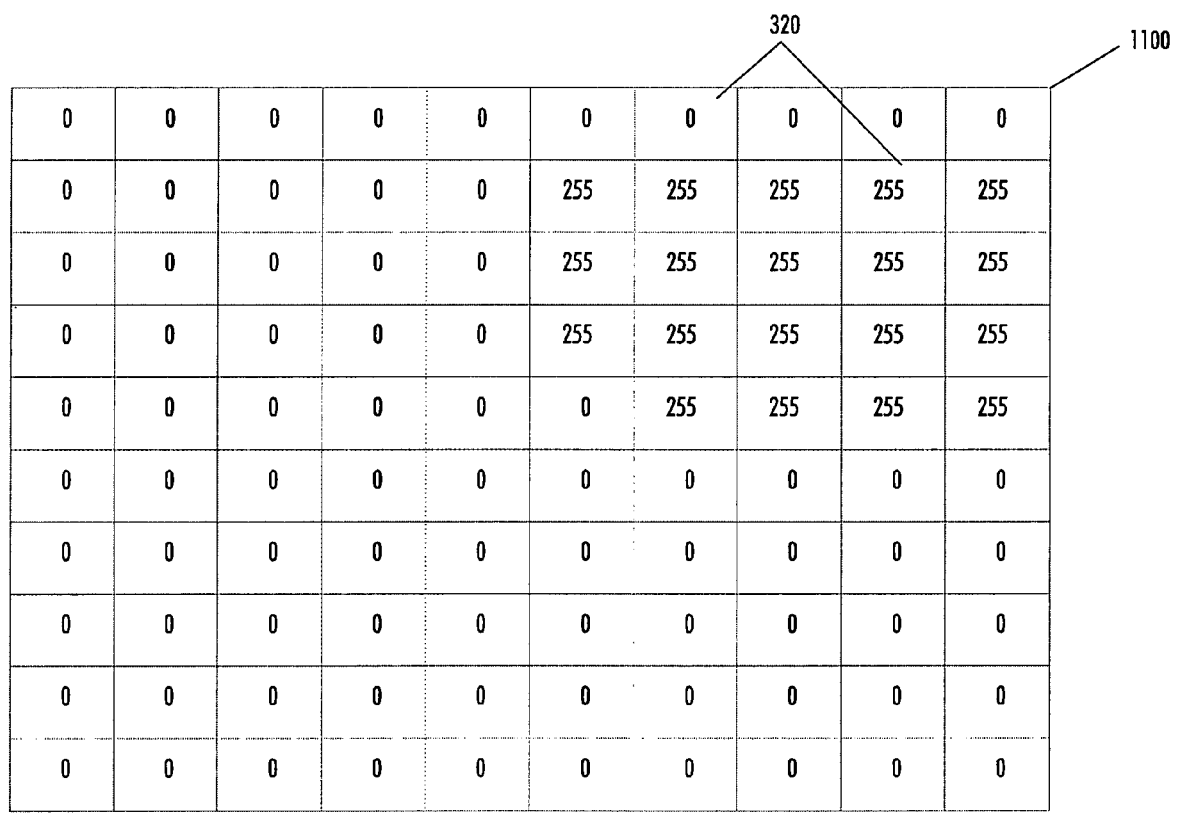
Figure 12:
Figure 13:
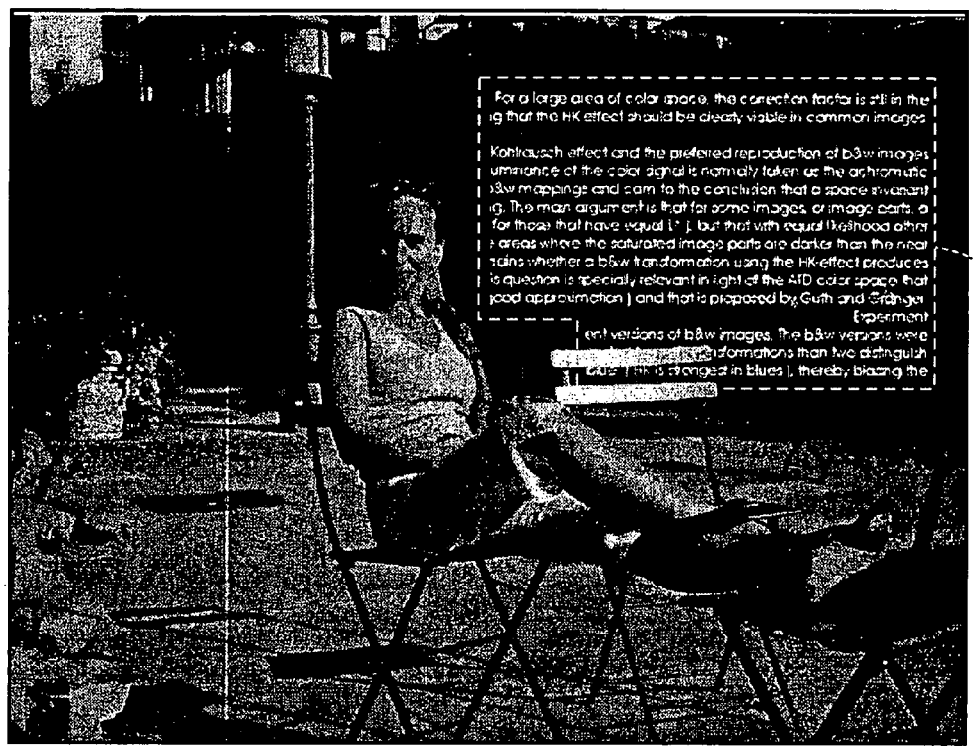

For example assume that the "target size" of the image overlay area is 30%. This would lead to a threshold of T %=20 (resulting in 39% selection for thresholding using "=T %" and 28% using ">T %"). A secondary selector is that an area has to be more than triple selected, i.e.: $T_s>30$ which creates the final selection map 1100 as illustrated in FIG. 11, having nineteen percent of the areas selected. At this point, a tertiary decision is used to determine if nineteen percent is a sufficiently large area. If so, the image is used. If the area size is too small, the image is 'rejected'. If accepted, the image would be modified in the large region 1210 as depicted in FIG. 12. Thus, the overlay can simply be located into the large region 1210, and as illustrated in FIG. 13, the image 300 can include the inserted text 1310 (e.g., variable content). It will be appreciated that for this example, no care was taken about text polarity, but that in an alternative embodiment, the text or overlaying data may be applied so as to provide adequate contrast to the underlying image (e.g., alternate polarity, contrasting colors, etc.) by changing color attributes of the overlay in response to the color attributes of the area, or alternately to exclude certain areas if the color attributes of the overlay can not be changed.

It should also be noted that the selected area might be considered a seed area and that a larger area is selected based on the seed area, where the intention is to minimize the overlay into other image areas. The selected areas are allowed to "bleed" or extend to or beyond edges provided that the edge area is above a second threshold. Or, as another alternative example, area geometry might be adjusted to a specified geometric arrangement by conditionally incorporating blocks that exceed a certain modified threshold.

In accordance with the method and examples disclosed herein, it will be apparent that basic contrast measurements can be used to identify image areas for text/graphic overlay in variable data printing situations. Here, the contrast criterion of luminance characterization and enhancement technique was used in a modified form, where the modification primarily influences the number of regions that are defined inside an image. The contrast metric can then be used to create a highly filtered contrast map that assures that only large, connected areas of low interest or contrast are identified. It will be further appreciated that the described area selection method may be augmented by other "relevance metrics" such as colorfulness, detail, etc., since all singular image analysis metrics are likely to fail in a large number of cases. Also the final overlay should—at least in the case of text—be adapted to the background image as is commonly done, either using simple Boolean operations (e.g., OR, XOR) or pre-selected color palettes based on the local image color as noted above.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for the automatic determination of a region of interest in an image, comprising:
    segmenting the image into a plurality of smaller regions, each region extending over a plurality of pixels;
    performing an analysis on each of said regions to characterize an aspect of the region relating to its level of importance in communicating information to a viewer, wherein said step of performing an analysis, includes determining a contrast value as an aspect characteristic for each region and averaging the contrast values across multiple regions;
    grouping adjacent regions having similar aspect characteristics; and
    identifying at least one group as a region of potential overlay.

2. The method of claim 1, wherein each region is rectangular in shape.

3. The method of claim 1, wherein image is segmented into a predefined number of regions.

4. The method of claim 1, wherein image is segmented in regions having at least one predefined dimension.

5. The method of claim 1, wherein said step of averaging the contrast values across multiple regions comprises applying a filter to the regions.

6. The method of claim 5, wherein said filter is a low-pass filter.

7. The method of claim 1, wherein determining a contrast value for each region comprises the steps of:
    for each region of the image, characterizing a local histogram signal representing the image signals within the region;
    comparing each local histogram signal to a reference histogram signal; and
    deriving a local contrast variance from the comparison, representing the flatness of the local histogram.

8. The method of claim 1, wherein said step of grouping adjacent regions comprises the steps of:
    identifying the contrast variance of the region with the greatest image contrast;
    based upon the contrast variance of each region, classifying each of the regions, as at least a region of high relevance or a region of low relevance, as compared to a region with the greatest contrast variance; and
    applying a threshold to the contrast variance values to identifying those regions with the lowest contrast.

9. The method of claim 8, wherein said step of applying a threshold includes selecting all areas above a threshold value.

10. The method of claim 8, wherein the step of applying a threshold includes selecting a predetermined number of regions having the highest contrast variance.

11. The method of claim 8, wherein the step of applying a threshold includes selecting regions using a conditional threshold and determining a Boolean combination of the different averages.

12. The method of claim 1, wherein the step of identifying at least one group as a region of potential overlay, is a function of image space required for an overlay region.

13. An automated document composition process, comprising:
    receiving a document including at least one image therein;
    specifying content to be overlaid on at least a portion of the image;
    identifying at least one low interest region of the image upon which the content may be overlaid, including segmenting the image into a plurality of smaller regions, each region extending over a plurality of pixels, performing an analysis on each of said regions to characterize an aspect of the region relating to its level of importance in communicating information to a viewer, grouping adjacent regions having similar aspect characteristics, and identifying at least one group as a region of interest, wherein performing an analysis, comprises
    determining a contrast value as an aspect characteristic for each region; and
    averaging the contrast values across multiple regions; and
    automatically inserting at least a portion of the content into at least the one region.

14. The process of claim 13, wherein grouping adjacent regions comprises:
    identifying the contrast variance of the region with the greatest image contrast;

based upon the contrast value variance of each region, classifying each of the regions, as at least a region of high relevance or a region of low relevance, as compared to the a region with the greatest contrast variance; and applying a threshold to the contrast variance values to identifying those regions with the lowest contrast.

15. The process of claim 13, wherein averaging the contrast values across multiple regions comprises applying a filter to the regions.

16. The process of claim 15, wherein said filter is a low-pass filter.

17. The process of claim 13, wherein determining a contrast value for each region further comprises:

for each region of the image, characterizing a local histogram signal representing the image signals within the region;

comparing each local histogram signal to a reference histogram signal; and deriving a local contrast variance from the comparison, representing the flatness of the local histogram.

18. The process of claim 13, wherein grouping adjacent regions having similar aspect characteristics comprises:

identifying the contrast variance of the region with the greatest image contrast;

based upon the contrast variance of each region, classifying each of the regions, as at least a region of high relevance or a region of low relevance, as compared to a region with the greatest contrast variance; and applying a threshold to the contrast variance values to identifying those regions with the lowest contrast.

* * * * *